United States Patent
Fang et al.

(10) Patent No.: US 7,365,744 B2
(45) Date of Patent: Apr. 29, 2008

(54) METHODS AND SYSTEMS FOR IMAGE MODIFICATION

(75) Inventors: Hui Fang, Champaign, IL (US); John C. Hart, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 336 days.

(21) Appl. No.: 10/899,268

(22) Filed: Jul. 26, 2004

(65) Prior Publication Data

US 2006/0017739 A1  Jan. 26, 2006

(51) Int. Cl.
G06T 15/30 (2006.01)

(52) U.S. Cl. ...................................... 345/423; 345/426

(58) Field of Classification Search ..................... None
See application file for complete search history.

(56) References Cited

U.S. PATENT DOCUMENTS

| | | | | |
|---|---|---|---|---|
| 5,414,804 | A * | 5/1995 | McWaid | 382/245 |
| 6,097,854 | A * | 8/2000 | Szeliski et al. | 382/284 |
| 6,529,192 | B1 * | 3/2003 | Waupotitsch | 345/419 |
| 6,577,307 | B1 * | 6/2003 | Hsiao et al. | 345/422 |
| 6,654,013 | B1 * | 11/2003 | Malzbender et al. | 345/426 |
| 6,850,233 | B2 * | 2/2005 | Hoppe et al. | 345/420 |
| 7,006,709 | B2 * | 2/2006 | Kang et al. | 382/294 |
| 2003/0103683 | A1 * | 6/2003 | Horie | 382/284 |
| 2003/0164838 | A1 * | 9/2003 | Guo et al. | 345/582 |
| 2003/0227464 | A1 * | 12/2003 | Lee | 345/584 |
| 2004/0212696 | A1 * | 10/2004 | Tsugita et al. | 348/231.6 |
| 2004/0256754 | A1 * | 12/2004 | Koguchi | 264/40.1 |
| 2005/0007378 | A1 * | 1/2005 | Grove | 345/582 |

OTHER PUBLICATIONS

Zhang, "Shape from Shading: A Survey", Nov. 1997, IEEE transactions on pattern anaysis and machine intelligence, vol. 21.*
Kwatra, Vivek, "Graphcut Textures: Image and Video Synthesis Using Graph Cuts", Jul. 2003, Siggraph, p. 1-10.*
Black, M. J., and Anandan, P. 1996. The robust estimation of multiple motions: Parametric and piecewise-smooth flow fields. *Computer Vision and Image Understanding, CVIU.* 63(1). pp. 75-104, Jan. 1996.
DeCarlo, D., and Metaxes, D. 2000. Optical flow constraints on deformable models with applications to face tracking. *Intl. J. of Comp. Vision* 38(2), July, 99-127.

(Continued)

*Primary Examiner*—Mark Zimmerman
*Assistant Examiner*—Kevin Xu
(74) *Attorney, Agent, or Firm*—Greer, Burns & Crain, Ltd.

(57) ABSTRACT

A method of the invention includes the steps of selecting at least a portion of an image on which to superimpose a texture and segmenting that portion of the image into a plurality of clusters. Each of the clusters is then parameterized with texture coordinates, and texture is assigned to each of the clusters using the texture coordinates to result in a texture patch. The texture patches are then blended together. This exemplary method of the invention has the result of the texture patches appearing to adopt the surface undulations of the underlying surface.

22 Claims, 3 Drawing Sheets

OTHER PUBLICATIONS

DeCarlo, D., and Metaxes, D. 2002. Adjusting shape parameters using model-based optical flow residuals. *IEEE Trans. On PAMI 24*(6), 814-823.

Fang, H., and Hart, J. C. 2004. Textureshop: Texture synthesis as a photograph editing tool. *Proc. SIGGRAPH 2004*. Los Angeles, California.

Lee, S.-Y., Chwa, K.-Y., Shin, S. Y., and Wolberg, G. 1995. Image metamorphosis using snakes and free-form deformations, *Proc. SIGGRAPH 1995*, Los Angeles, California.

Liu, Y., Lin, W.-C., and Hays, J. 2004. Near-regular texture analysis and manipulation. *TOG 23*(3), 368-376. (Proc. SIGGRAPH).

Pollefeys, M., Gool, L. V., Vergauwen, M., Verbiest, F., Cornelis, K., Tops, J., and Koch, R. 2004. Visual modeling with a hand-held camera. *Intl. J. Comp. Vision 59*(3), 207-232.

Zhang, R., Tsai, P.-S., Cryer, J. E., and Shah, M. 1999. "Shape from shading: A survey." *IEEE Transactions on Pattern Analysis and Machine Intelligence 21*(8), 690-706.

Zhang, L., Dugas-Phocion, G., Samson, J.-S., and Seitz, S. 2001. Single view modeling of free-form scenes. *Proc. CVPR*.

Zhang, L., Curless, B., and Seitz, S. M. 2003. Spacetime stereo: Shape recovery for dynamic scenes. *Proc. CVPR*, 367-374.

Zhang, L., Snavely, N., Curless, B., and Seitz, S.M. 2004. Spacetime faces: High resolution capture for modeling and animation. *Proc. SIGGRAPH 2004*, 548-558.

Bertalmio, M., Sapiro, G., Caselles, V., and Ballester, C. "Image inpainting," *Proc. SIGGRAPH 00*, 417-424 (2000).

Drori, I., Cohen-Or, D., and Yeshurun, H. "Fragment-based image completion," *Proc. SIGGRAPH 03*, 303-312 (2003).

Efros, A. A., and Freeman, W. T. "Image quilting for texture synthesis and transfer," *Proc. SIGGRAPH* (2001).

Horn, B. K. "Height and gradient from shading," *International journal of computer vision*, 5:1,, 37-75, (1990).

Ismert, R. M., Bala, K., and Greenberg, D. P. "Detail synthesis for image-based texturing," *Proc. 13D*, 171-175 (2003).

Kwatra, V., Schoedl, A., Essa, I., Turk, G., and Bobick, A. "Graphcut textures: Image and video synthesis using graph cuts," *Proc. SIGGRAPH* (2003).

McNamara, A., Treuille, A., Popovic, Z., and Stam, J. "Keyframe control of smoke simulations," *Proc. SIGGRAPH* (2003).

Oh, B. M., Chen, M., Dorsey, J., and Durand, F. "Image-based modeling and photo editing" *Proc. SIGGRAPH* 433-442 (2001).

Perez, P., Gangnet, M., and Blake, A. "Poisson image editing" *Proc. SIGGRAPH* 313-318, (2003).

Shade, J., Gortler, S., Wei He, L., and Szeliski, R. "Layered depth images" In *Proc. SIGGRAPH* 231-242 (1998).

Turk, G. "Texture synthesis on surfaces," *Proc. SIGGRAPH* (2001).

Wei. L., Y., and Levoy, M. "Texture synthesis over arbitrary manifold surfaces" *Proc. SIGGRAPH 2001*.

Heeger et al., "Pyramid-Based texture analysis/synthesis," *Proc. SIGGRAPH* 229-238 (1995).

DeBonnet, "Multiresolution sampling procedure for analysis and synthesis of texture images," *Proc. SIGGRAPH* 361-368 (1997).

Ashikhmin, "Synthesizing natural textures." 2001 ACM Symposium of Interactive 3D Graphics (2001).

Paul E. Debevec, Camillo J. Taylor, Jitendra Malik, "Modeling and Rendering Architecture from Photographs: A hybrid geometry-and image-based approach". In *SIGGRAPH '96* (Aug. 1996), pp. 11-20.

Paul Debevec, Yizhou Yu, George Borshukov, "Efficient View-Dependent Image-based Rendering with Projective Texture-Mapping", 1998.

\* cited by examiner

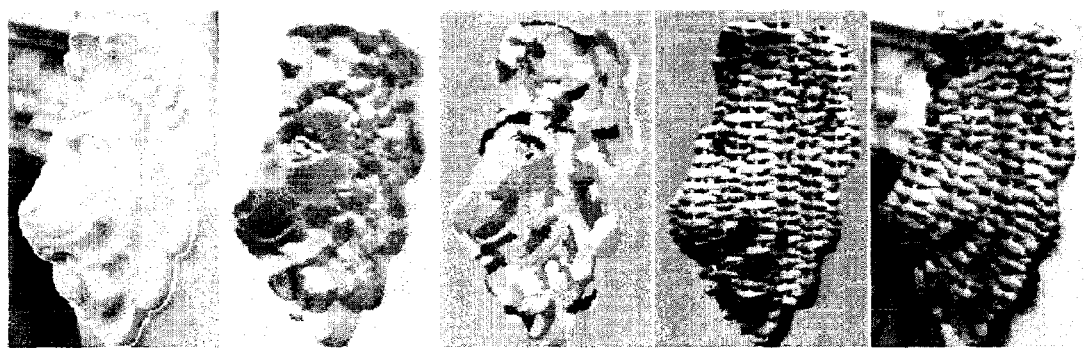
FIG. 2A  FIG. 2B  FIG. 2C  FIG. 2D  FIG. 2E
FIG. 2
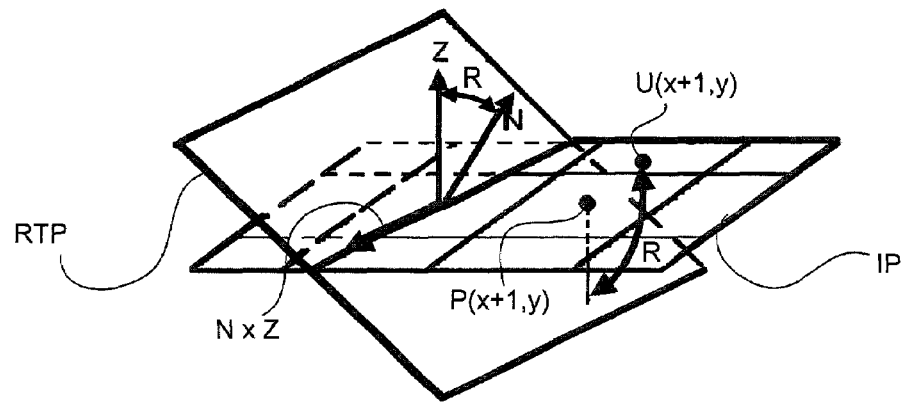
FIG. 3
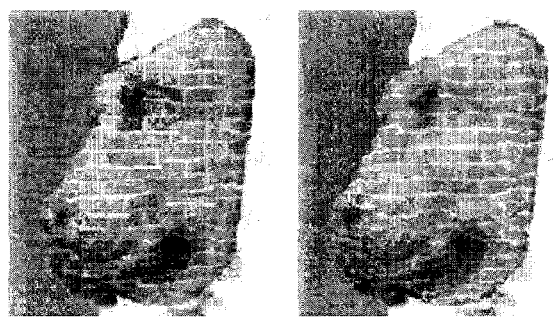
FIG. 4A  FIG. 4B
FIG. 4

A

B

METHODS AND SYSTEMS FOR IMAGE MODIFICATION

STATEMENT OF GOVERNMENT INTEREST

This invention was made with Government assistance under National Science Foundation Grant No. ACI-0121288. The government has certain rights in the invention.

FIELD OF THE INVENTION

The present invention is related to systems and methods for modifying images, with systems and methods for modifying a two-dimensional representation of a three-dimensional surface being one example.

BACKGROUND OF THE INVENTION

The availability of powerful computer processors at relatively low prices has resulted in many recent methods and systems for processing and manipulating images such as photographs. Computer program-based editing tools are available, for example, that allow two-dimensional images including photographs to be manipulated or edited. Images may be cropped, rotated, skewed in one or more directions, colored or un-colored, and the brightness changed, to name some of the example manipulations that can be made. Images may also be "cut and pasted," wherein a selected portion of one image is superimposed over a selected portion of a second image. Another known method is so-called "in-painting," in which an image is extended across regions that have been left blank after removing an unwanted object. Image in-painting typically draws the samples to be filled into blank regions of an image from another portion of the image, and solves a system of partial differential equations to naturally merge the result.

It is also known to analyze a two-dimensional representation of a three dimensional surface to obtain attributes of the three-dimensional surface. For example, so called "shape from shading" methods are known for reconstructing a three-dimensional surface based on the shading found in a two dimensional representation of the original surface. Generally, shape from shading methods recreate a surface by assuming that bright regions of the two-dimensional representation face toward a light source and darker regions face perpendicular or "away" from the light source. Thus a per-region surface normal can be estimated. Reconstruction of a surface from these recovered per-region surface normals, however, can lead to inconsistencies. Shape from shading methods are therefore most often presented in an optimization framework wherein differential equations are solved to recover the surface whose normals most closely match those estimated from the image.

So-called "texture synthesis" is also known, wherein a two-dimensional texture sample is use to generate multiple new, non-repetitive texture samples that can be patched together. By way of example, a photograph of a small portion of a grass lawn can be used to generate a much larger image of the lawn through texture synthesis. Instead of simply repeating the small sample image, texture synthesis can employ a machine learning or similar technique to "grow" a texture matching the characteristics of the original. Each newly "grown" pixel in the synthesized texture compares its neighborhood of previously "grown" pixels in the synthesized texture with regions in the original texture. When a matching neighborhood is found, the newly grown pixel's color is taken from the corresponding pixel in the matching neighborhood in the original texture. Examples of texture synthesis methods include "Pyramid-Based texture analysis/synthesis," by Heeger et al., Proceedings of SIGGRAPH 95 (1995) 229-238; "Multiresolution sampling procedure for analysis and synthesis of texture images," by DeBonnet, Proceedings of SIGGRAPH 97 (1997) 361-368; and "Synthesizing natural textures," by Ashikhmin, 2001 ACM Symposium of Interactive 3D Graphics (2001), all of which are incorporated herein by reference.

Recent texture synthesis work includes "Image Quilting for Texture Synthesis and Transfer," by Alexei A. Efros and Willian T. Freeman Proc. SIGGRAPH (2001) and "Graphcut textures: Image and video synthesis using graph cuts", by Kwatra, V. et al. Proc. SIGGRAPH (2003) ("the Graphcut reference"), also incorporated herein by reference. These methods find seams along which to cut to merge neighboring texture swatches so the transition from one swatch to another appears realistic (e.g., the seam falls along the boundary of texture features).

Texture synthesis can be applied to surfaces if there is already a 3-dimensional representation of the surface, for example see "Texture Synthesis on Surfaces" by Greg Turk, Proc. SIGGRAPH (2001), and "Texture Synthesis over Arbitrary Manifold Surfaces" by Li Yi Wei and Marc Levoy, Proc. SIGGRAPH (2001). Also, it is known to apply shape-from-shading to construct a 3-dimensional geometric representation approximating a two-dimensional photographed surface, and then performing texture synthesis on that 3-dimensional geometric representation. However, this method leads to visual artifacts due to the error of reconstructing a globally consistent surface from locally estimated surface normals.

SUMMARY OF THE INVENTION

A method for modifying an image includes the steps of selecting at least a portion of the image on which to superimpose a texture and segmenting the at least a portion of the image into a plurality of clusters. Each of the clusters is then parameterized with texture coordinates, and texture is assigned to each of the clusters using the texture coordinates to result in a texture patch. The texture patches are then blended together. As a result of practice of this method, the texture patches appear to adopt the surface undulations of the underlying surface.

BRIEF DESCRIPTION OF THE FIGURES

FIG. 2A-2E illustrate the results of practice of various steps of an exemplary method of the invention on a photograph of a statue of a lion;

FIG. 3 is a schematic useful to illustrate steps of parameterizing a cluster with texture coordinates;

FIG. 4 is useful to illustrate an exemplary step of patch deformation;

DETAILED DESCRIPTION

Figure 1:
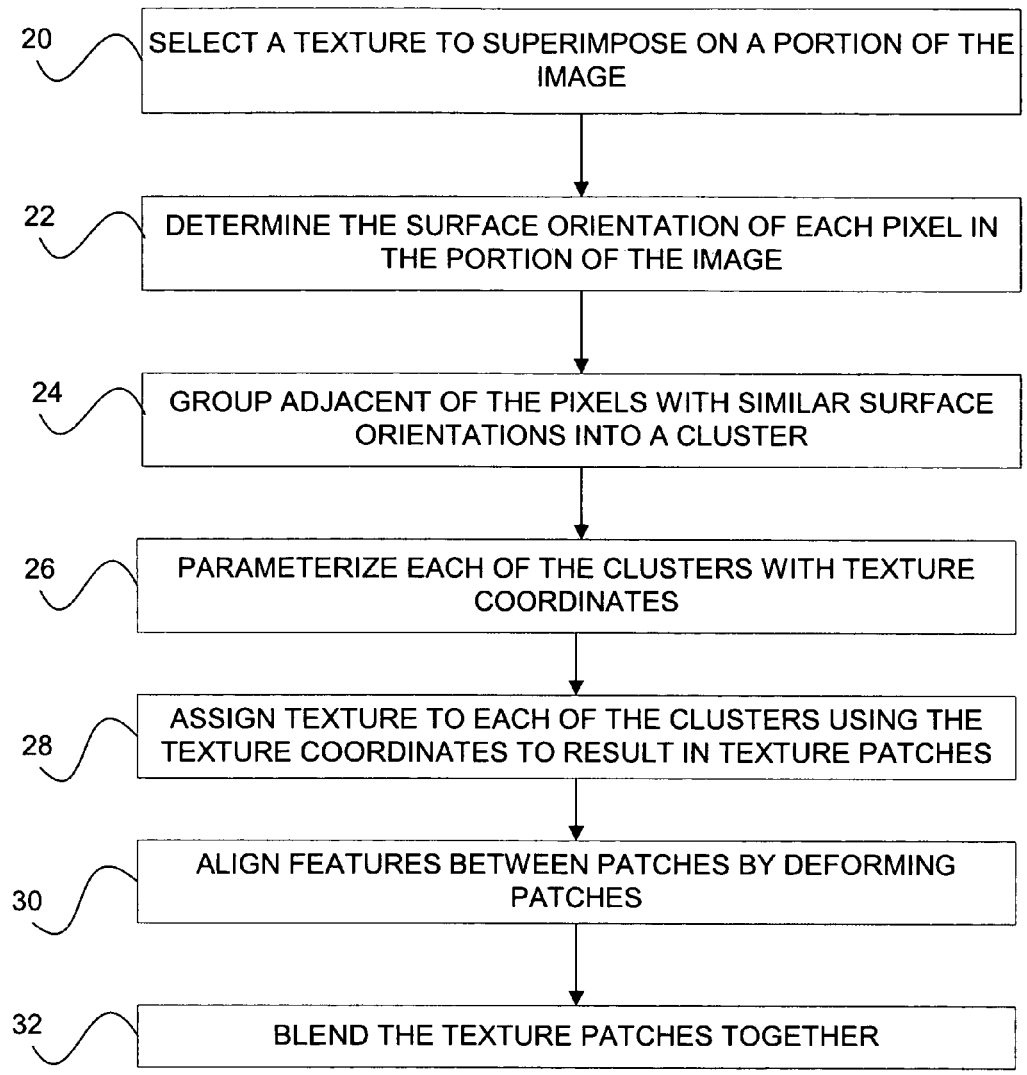
FIG. 1 is a flowchart illustrating an exemplary method for modifying a two-dimensional image.

Turning now to the drawings, FIG. 1 is a flowchart illustrating an exemplary method for modifying a two-dimensional image of a three-dimensional surface. As used herein, the term "three dimensional surface" is intended to broadly refer to any three-dimensional phenomenon that when projected onto a 2-dimensional field of radiance samples (e.g., image pixels), conveys adequate information from which the corresponding per-sample orientation can be estimated. One example is a 2-dimensional photograph of a 3-dimensional Lambertian (diffuse) 2-manifold surface. A texture is selected to superimpose on a portion of the image (block 20). As used herein, the term "texture" is intended to broadly refer to any synthesized or stored sequence of image regions or portions. For example, a texture may be a possibly manipulated photograph or the result of a stochastic process. Specific examples of textures include, but are not limited to, a two-dimensional pattern of objects such as grass, bricks, sand, cars, faces, animals, buildings, etc.

In an exemplary method of the invention, the image on which the method is practiced is defined by a multiplicity of individual units, which in the example of a digital photograph or image may be pixels. The exemplary method includes a step of determining the surface normal of each individual unit (pixel in the case of a digital image) of the portion of the image on which the texture is to be superimposed (block 22). Although different steps are contemplated for determining the surface normal, a preferred method is to use the shading of the individual units or pixels. For example, shading can be indicative of orientation to a light source and hence can be used to estimate a surface normal. The portion of the image is then segmented by grouping together adjacent pixels having similar surface normals into clusters (block 24). Other methods for segmenting pixels into clusters are also contemplated with examples including use of color or location.

Once the pixels have been segmented into clusters, the clusters are individually parameterized with texture coordinates. (block 26) As used herein, the term "parameterize" is intended to broadly refer to mapping surface undulations in a two dimensional coordinate system. For example, parameterizing may include assigning coordinates to each image pixel to facilitate the realistic assignment of texture. Parameterizing may thereby include capturing the 3-dimensional location of points projected to individual pixels of the image, and assigning a 2-dimensional texture coordinate representation to the surface passing through these 3-dimensional points. The resulting 2-dimensional texture coordinates may also be referred to as an image distortion since each 2-dimensional pixel is ultimately assigned a 2-dimensional texture coordinate.

Through parameterization, the texture coordinate assigned to each individual unit or pixel in each cluster captures the projection of the 3-dimensional coordinate onto the image plane, and indicates the surface coordinates per-pixel. This allows for the distance traveled along the surface as one moves from pixel to pixel in the cluster to be measured. For example, the latitude and longitude coordinates of the earth can be considered a texture coordinate (u,v) (i.e., u=latitude, v=longitude) and an image of the earth taken from space would have for each pixel in the disk of the earth's projection assigned its latitude and longitude as its surface texture coordinates. As one traveled from the center of this image toward the edge of the disk in one-pixel units, the change in (u,v) (i.e., latitude, longitude) would increase. Parameterization may also include a per-patch rotation such that the texture "grain" (anisotropic feature) follows a realistic direction. The direction to be followed may be input by a user or otherwise determined. Thus the step of parameterizing into texture coordinates captures the estimated undulation of the photographed surface.

Texture is then assigned to the cluster using the texture coordinates to create a texture patch for each cluster. (block 28) Those knowledgeable in the art will appreciate that there are many suitable steps for assigning texture values to the pixels. By way of example, patches may simply be cut from a larger texture swatch, or a single patch may be cut and be repeatedly duplicated. More preferably, a texture synthesis process is used to generate non-repeating patches that provide a more realistic final visual appearance.

In some applications, a step of aligning features between texture patches may be performed to bring features into alignment with one another for a more realistic and continuous appearance. (block 30) This feature matching may be performed, for example, by deforming the patches through an optimization process that seeks to match the pixels in neighboring patches.

The texture patches are then blended together. (block 32) As used herein, the term "blended" is intended to be broadly interpreted as being at least partially combined so that a line of demarcation separating the two is visually plausible as coming from the same material. Once blended, the texture patches appear to form a single, continuous texture swatch that adopts the surface undulations of the underlying portion of the image. Methods of the invention thereby offer a convenient, effective, and elegant tool for modifying a two-dimensional image.

Having now presented an exemplary embodiment of a method for modifying a two-dimensional image, an additional exemplary method and its steps may be described in greater detail with reference to an exemplary two-dimensional image of a three dimensional surface. FIG. 2A is a two-dimensional image of a three-dimensional surface; namely a photograph of a statue of a lion. In a step of a method of the invention, the portion of FIG. 2A showing the lion's face (outlined with a white line in FIG. 2A) is selected for superimposing a texture on, and a wicker is selected as the source texture. (FIG. 1, block 20)

The surface normal of each pixel is then obtained for the portion of the image showing the lion's face, preferably through a shape from shading technique. (FIG. 1, block 22) The obtained surface normals will then be used to segment the selected portion of the lion's face into clusters. Artisans will appreciate that several methods are available for determining surface normals from an image, with examples disclosed in "Height and gradient from shading," by Horn, International Journal of Computer Vision, 5:1, 37-75, (1990); herein incorporated by reference.

A preferred step for estimating surface normals that has been discovered to offer useful accuracy in addition to relative computational speed and ease is use of a Lambertian reflectance model. In one such model, S is the unit vector from the center of each pixel toward a sufficiently distant point light source. It is assumed that the pixel having the largest light intensity $I_{max}$ (the brightest point) faces the light source, and the pixel having the lowest intensity (the darkest point) is shadowed and its intensity $I_{min}$ indicates the ambient light in the scene. The function $$c(x, y) = \frac{(I(x, y) - I_{\min})}{(I_{\max} - I_{\min})}$$

can be used to estimate the cosine of the angle of light incidence, and $$s(x, y) = \sqrt{1 - c(x,y)^2}$$

can be used to estimate its sine. These estimates lead to the recovered normal N(x, y):

$$G(x, y) = \nabla I(x, y) - \nabla I((x, y) \cdot S)S$$

$$N(x, y) = c(x, y)S + \frac{s(x, y)G(x, y)}{\|G(x, y)\|}$$

where $$\nabla I(x, y) = \left(\frac{\partial I}{\partial x}, \frac{\partial I}{\partial y}, 0\right)$$

is the image gradient.

The exemplary steps next estimate the vector to the light S from the intensity of pixels $(x_i, y_i)$ on the boundary of the object's projection. For such pixels the normal $N(x_i, y_i)$ is in the direction of the strong edge gradient. The source vector S is then the least-squares solution to the overconstrained linear system:

$$N(x,y) \cdot S = (I(x,y) - I_{min})/(I_{max} - I_{min}).$$

Practice of these exemplary steps can be further illustrated by consideration of FIG. 2B showing estimated surface normals as small black lines. It will be appreciated that these steps of an exemplary method assume a single light source. Other embodiments of the invention contemplate multiple light sources, and may include additional steps of a user adjusting the light source direction manually if the inferred result is incorrect. For example, a method of the invention may be practiced interactively on a computer wherein a user views results on a screen and can dynamically alter the light source location to change results. Iterative adjustment may be performed until a suitable image is obtained.

The normal field thus estimated may not be as accurate as normals estimated through more rigorous analysis. While other methods of the invention can be practiced using more rigorous models, it has been discovered that these exemplary steps that utilize a Lambertian reflectance model provide a useful level of accuracy to capture the undulations of a surface well enough for practice of the invention. Also, these exemplary steps achieve advantages and benefits related to computational speed and ease. These exemplary steps have been discovered to be suitably fast, for example, to be used in an interactive photograph computer program product on a typically equipped consumer computer.

In an additional step of the exemplary method, the surface pixels are grouped or segmented into clusters with similar normal directions using a bottom-up scheme in which a relatively large collection of small units is merged into a smaller collection of larger elements. (FIG. 1, block 24) Generally, adjacent pixels having similar normal directions will be joined together into a cluster. Depending on factors such as the size of the cluster and the severity of the underlying surface undulations, the clusters may have a generally uniform orientation or may have significant surface undulations. Artisans will appreciate that different steps and standards will be useful for establishing that two adjacent pixels have "similar" normals. By way of example, two unit-length normals may be compared using their dot product, which ranges from −1 to 1 and indicates the cosine of the angle between them.

In an exemplary set of steps to cluster adjacent pixels, the segmentation process is initialized by first assigning each pixel to its own cluster. Two adjacent clusters are then merged if an error metric is satisfied, with the error metric including terms related to the size of clusters, the roundness of clusters, and the similarity of normals of pixels within each cluster. In one such error metric, $P_i$, $N_i$, $C_i$ and $|P_i|$ denote the cluster's mean normal, centroid pixel and number of pixels, respectively. Two neighboring clusters $P_1$, $P_2$ are merged if the error metric $$E(P_1, P_2) = k_1(1 - N_1 \cdot N_2)^{1/2} + k_2\|C_1 - C_2\| + k_3(|P_1| + |P_2|)$$

falls below a given threshold. In this equation, constant $k_1$ affects the similarity of normals in each cluster, constant $k_2$ the roundness of the clusters, and $k_3$ the size of the clusters. Appropriate settings for the constants $k_1$ $k_2$ and $k_3$ will yield moderate-sized round clusters of similarly oriented pixels. Substantially round and relatively small clusters are preferred. In exemplary cases constants of $k_1 = 187$, $k_2 = 20$, $k_3 = 1$ have been useful. By way of example, FIG. 2C shows the clusters having been created according to this error metric and constant values. Those knowledgeable in the art will appreciate that many other constant values, error metrics, and other steps will be appropriate for segmenting into clusters within the practice of the invention.

A preferred step of segmenting into clusters further includes expanding the clusters so that they overlap onto one another to define an overlap region between adjacent clusters. For example, expanding the clusters by a fixed-width boundary, with 8 or 16 pixels being examples, may be performed to define an overlap region between adjacent patches.

Once the pixels have been segmented into clusters, they are parameterized with texture coordinates and texture is assigned according to the texture coordinates. (FIG. 1, blocks 26 and 28) Parameterizing each cluster can include distorting the clusters by assigning some or all of the pixels P(x,y) in each patch a new position in texture coordinates U(x,y)=(u,v) to capture the foreshortening distortion due to its recovered normal. Exemplary steps of parameterizing begin by setting an origin pixel, preferably at the center pixel P(0,0) of a cluster, setting its texture coordinates to U(0,0) =(0,0), and estimating a parametric distortion for all other pixels in the cluster by using the recovered surface normals and propagating outward to the rest of the cluster in a width-first floodfill order.

With reference to FIG. 3, exemplary steps use P(x,y) to indicate the pixel at (x, y) with distorted position U(x,y) and recovered (unitized) normal $N(x,y) = (N_x, N_y, N_z)$. Given P(x, y), exemplary steps compute the foreshortening distortion of the next pixel to its right P(x+1, y) by projecting this pixel's position (x+1,y,0) onto the recovered tangent plane RTP of pixel P(x,y) and then rotating this projection back into the image plane IP, as illustrated in FIG. 3. The distortion is cumulative and propagates by adding the resulting offset to the current distortion U(x,y) and storing the result in U(x+1, y).

The projection of the point (x+1, y, 0) onto the plane with normal N(x, y) passing through (x, y, 0) is $(x+1, y, -N_x/N_z)$. Let q be the angle between N and Z=(0,0,1) and abbreviate $c=\cos\theta=N_z$, and $s=\sin\theta=(N_x^2+N_y^2)^{1/2}$. The unitized axis of rotation is $(N\times Z)/\|N\times Z\|=(N_y/s, -N_x/s, 0)$ which leads to the rotation matrix:

$$R = \begin{bmatrix} c+(1-c)N_y^2/s^2 & -(1-c)N_xN_y/s^2 & -N_x \\ -(1-c)N_xN_y/s^2 & c+(1-c)N_x^2/s^2 & -N_y \\ N_x & N_y & N_z \end{bmatrix}$$

The product $R(1, 0, -N_x/N_z)$ yields the new position of pixel $P(x+1, y)$, leading to the propagation rules:

$$U(x\pm1,y)=U(x,y)\pm(1+N_z-N_y^2,N_xN_y)/((1+N_z)N_z),$$

$$U(x,y\pm1)=U(x,y)\pm(N_xN_y,1+N_z-N_x^2,)/((1+N_z)N_z)$$

It has been discovered that setting a minimum for $N_z$ and renormalizing $N_x$ and $N_y$ is useful to avoid unreasonable results. In exemplary applications, a minimum of about 0.1 for $N_z$ has proven useful.

When practicing the exemplary steps of parameterizing, if the distortions of more than one neighboring pixel are available for propagation then the final orientation distortion is the mean of the distortions computed from each of these neighbors. This step of averaging reveals that this scheme can generate an inconsistent parameterization, and that these inconsistencies can increase in severity with distance from the centroid. For this and other reasons, generally small and substantially round texture patches are preferred. These patches reduce the variance of their normals to keep these internal inconsistencies small.

Parameterizing with texture coordinates may also include orienting the texture to more consistently align anisotropic features of the synthesized texture. An exemplary orienting step includes rotating patch parameterization about its centroid (conveniently the origin of the parameterization) to align the texture direction vector with the appropriate axis of the texture swatch according to user input. User input may be provided, for example, by specifying a rotation direction through a computer input device such as a keyboard, mouse, or the like when practicing the invention on a computer. By way of particular example, vector field orientation can be modified by dragging a mouse over the image while displayed on a computer screen. The rotation of the parameterization effectively rotates the patch about its average normal. It will be appreciated that orienting the texture patches may also be accomplished without user input, and may be performed on a cluster (i.e., before assigning texture).

In some applications, features may be aligned in the synthesized texture through patch deformation. (FIG. 1, block 30) This may be desirable, for example, to provide additional realism when practicing the invention with textures that include low frequency and easily noticed features. These features may be positioned within the texture patch (es) at locations that result in an unrealistic appearance—they don't realistically align from patch to patch.

Figure 5:
FIG. 5 is useful to illustrate a step of performing a displacement mapping.

An example of a step of feature aligning through patch deformation is illustrated by FIG. 5, with FIG. 5A showing brick texture patches superimposed on the lions face portion of the statue without patch deformation, and FIG. 5B showing the same image after the patches have been deformed to match features in adjoining patches. Steps of deformation and the patches are discussed in "Textureshop: Texture Synthesis as a Photograph Editing Tool" by Hui Fang and John C. Hart, Proc. SIGGRAPH (2004), incorporated herein by reference.

Artisans will appreciate that many suitable methods are known for aligning texture features within practice of the invention. It has been discovered that a suitable method includes using a deformation algorithm that resembles methods used in smoke animation, which are discussed in detail in "Keyframe control of smoke simulations" by McNamara et al., Proc. SIGGRAPH (2003), incorporated herein by reference. Exemplary steps of aligning the features include utilize the overlapping region that was defined when the clusters were expanded. The synthesized texture in this overlap region between patches $P_1(x,y)$ and $P_2(x,y)$ is blurred. For each pixel position $x=(x,y)$ in the overlapping boundaries of the patches, a 2-dimensional deformation vector $U(x)$, is defined and initialized to $(0,0)$. An objective function is then defined as:

$$\phi=k_1\Sigma\|P_1(x)-P_2(x+U(x))\|+k_2\Sigma|\nabla\cdot U(x)|$$

to maximize the color match while minimizing the amount of deformation over the patch overlap region, where the constant $k_1$ governs color match and $k_2$ controls the severity of deformation. In an example application, $k_1=1$, $k_2=9$, and RGB channels ranged from $0\ldots 255$. The exemplary feature mapping implementation computed $\partial\phi/\partial U(x)$ and minimized $\phi$ using conjugate gradients. It has been discovered that the deformation vector can be solved on a subset of the overlapping pixels and interpolated on the rest to accelerate convergence and further smooth the deformation, although doing so may have the disadvantage of overlooking the matching of smaller features.

In a subsequent step, the texture patches are blended together (FIG. 1, block 32). Blending helps to camouflage any inconsistencies between patches. The overlap region defined when the clusters were expanded is again utilized. A visually plausible seam within this overlap region is determined, with the patch border then cut along this seam. The term "seam" as used herein in this context is intended to broadly refer to the boundary between two neighboring textured patches. The seam preferably falls along matching portions of texture features, along paths of texture values shared by both neighboring texture patches, such that the transition from one patch's texture to a neighbor's is visually plausible.

One exemplary seam optimization that has been discovered to be useful within practice of some invention embodiments is known as "graphcut," and is described in detail in the Graphcut reference. The Graphcut method segments an image into overlapping patches and uses a max-flow algorithm to find a visually plausible path separating the overlapping texture between each pair of neighboring patches. Graphcut texture synthesis creates a new texture by copying irregularly shaped patches from the sample image into the output image. The patch copying process is performed in two stages. First a candidate patch is selected by performing a comparison on the overlapping regions that exists between the candidate patch and the neighboring patches already in the output image. Second, an irregularly shaped portion of this patch interior to the desired seam is computed and only the pixels from this interior portion are copied to the output image. The portion of the patch to copy is determined by using a graphcut algorithm.

The graphcut algorithm seeks to find a visually plausible (i.e., suitably satisfying an optimization) seam at which to cut the patch. A suitable seam location can be computed using an optimization calculation that seeks to optimize (to a suitable degree) the similarity of pixel pairs across the seam after placing the new patch in the synthesized texture.

An exemplary cost function for cutting a seam through the overlapping region is a weighted combination of pixel color and recovered surface normal, though color alone suffices in many cases. An optimal seam will be the seam that results in the least noticeable difference at the boundary of the patch when joined with existing patches. In the graphcut method, these steps have been formalized in the form of a Markov Random Field. For further details of the graphcut steps for generating non-recurring texture clusters, reference is made to the Graphcut reference that has been incorporated herein by reference. Those knowledgeable in the art will appreciate that other blending techniques will also be useful, and that sub-optimal seam solution will be acceptable in many cases and may be employed to achieve computational efficiencies and for other reasons. FIG. 2D illustrates the result of having parameterized the lions' head portion of the image, having assigned texture to the texture coordinates generated to result in texture patches, and having blended the patches together.

Exemplary methods of the invention discussed and shown so far have recovered a local surface on which to superimpose a texture swatch. When practicing the invention with some particular textures, it has been discovered that additional steps of performing a displacement mapping on the texture swatch can lead to a more realistic result. That is, the exemplary method steps illustrated have recovered the undulation of an underlying surface and superimposed texture on it. The superimposed texture appears to capture the underlying surface undulations. But the texture itself may be "flat." For many textures, a flat appearance is realistic and is acceptable. For others, however, additional realism may be achieved by performing a step of displacement mapping. Textures that have a surface with considerable undulations to it are an example, with wicker being one particular example. Displacement mapping takes into account the undulation of the source texture (e.g., the wicker itself). A step of displacement mapping recovers the undulation of the source texture swatch by applying shape from shading to it.

Exemplary steps of performing a displacement mapping include estimating the normals $\hat{N}(x, y)$ of the texture swatch through shape from shading using the same method discussed herein above. But whereas the object surface was reconstructed locally for the portion of the image that the texture is to be superimposed on, the texture swatch will require a global surface reconstruction. In an exemplary set of steps, it is assumed that the input texture color variation is caused only by local normal changes, and accordingly the height field of the texture swatch $h(x,y)$ may be determined by the Poisson equation:

$$\nabla^2 h(x, y) = \nabla \cdot \hat{N}(x, y)$$

and solved by conjugate gradients. In a further exemplary method step, the user specifies an origin height of a portion of the texture to create a boundary condition. For example, a shadowed area may be set as an origin or zero height. Features reconstructed using this Poisson equation often shrink or grow when compared to the original. Steps of correcting these inconsistencies may be performed by, for example, by interactively correcting through a user-specified nonlinear scale of the height field.

Further exemplary steps of translating each texture sample in the direction of the image's recovered normal ($N_x$, $N_y$, 0) by the recovered texture height $h(x,y)$ foreshortened by the recovered texture normal $\sqrt{1-N_z^2}$ can also be performed. To avoid inconsistencies such as holes and otherwise noisy appearance, both the surface normal and texture height may be interpolated and represented at a higher resolution. These displacements may be significant enough to cause aliases when a texture, such as wicker, contains sharp edges. It has been discovered. that these artifacts can be sufficiently reduced by blending the edge samples through steps that include, for example, the Painter's algorithm of depth sorting from back to front in which distant objects are rendered before nearer objects which may obscure the distant objects.

FIG. 2E illustrates the results of performing steps of orienting the wicker texture patches and performing a displacement mapping on them. Exemplary steps of applying a displacement mapping and filtering it may be further illustrated by FIG. 5. The image shown in FIG. 5A includes a wicker texture swatch superimposed through a method of the invention without displacement mapping. The smooth silhouette of the swatch may be improved upon through application of a displacement mapping to result in a more realistic appearance. FIG. 5B results from steps of applying a displacement mapping on the swatch after interpolation to a higher resolution texture representation to avoid holes in the output image, but shows a somewhat noisy mapping. The noisiness of the mapping has been removed in FIG. 5C through an antialiasing step of edge filtering. That is, during displacement mapping, the pixels synthesized by the texture are placed in new positions in the destination image. These new locations may not fall exactly on existing destination pixels, but instead in regions between destination pixels. Antialiasing through edge filtering is performed by allowing the nearest destination pixel to take on a portion of the value of the desired displacement-mapped texture.

Figure 6:
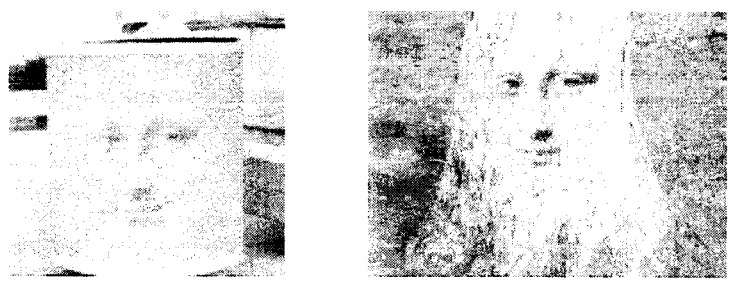
FIG. 6 illustrates the results of practice of an additional method of the invention useful to emboss an image with the surface undulations of another image.

FIG. 6 is useful to illustrate the result of practice of a method of the invention in still another application. An exemplary method for modifying an image consistent with that illustrated in FIG. 1 was practiced, with a few additional steps used. The result of this method of the invention is to modify an image whereby it appears to have been embossed with the surface undulations of a second image. For example, FIG. 6A is an image of a concrete and stone waste container that appears to have the surface undulations of a portion of the famous Mona Lisa face, and FIG. 6B is an image of a tree trunk that similarly appears to have been embossed with the Mona Lisa's surface.

Referring to FIG. 6A, a portion of the image of a concrete and stone waste container was selected as both the texture source and the image over which to superimpose texture onto. (FIG. 1, block 20) The superimposed texture, however, will appear to follow surface undulations of a second image: the face of the famous Mona Lisa painting. The surface normals for each pixel in a selected portion of the stone waste container image are recovered through shape from shading (FIG. 1, block 22).

In an additional step of this embodiment of the invention, the surface normals for the face of the Mona Lisa are then determined using steps consistent with those discussed above with regard to block 22, and these recovered normals are combined with the surface normals recovered from the stone waste container. Those knowledgeable in the art will appreciate that there are a number of methods available for combining the normals. A preferred step includes blending the normals using Poisson image editing which is described in detail in Poisson Image Editing, by Perez, P., et al., SIGGRAPH (2003), incorporated herein by reference.

The pixels of the selected portion of the stone waste container are then segmented into clusters (FIG. 1, block 24) using the blended normals that represent their original normals combined with those transferred from the Mona Lisa. These clusters are then parameterized with texture coordinates (FIG. 1, block 26), and texture from the original stone waste container synthesized on each texture coordinate patch pixel by pixel according to the texture coordinates. (FIG. 1, block 28) The texture patches are deformed (FIG. 1, block 30), and blended together (FIG. 1, block 32).

The result of practice of these steps is shown in FIG. 6A, in which a portion of the concrete waste container appears to have adopted the underlying surface undulations of the Mona Lisa face. The brightness of the portion of the Mona Lisa may likewise be blended into the portion of the stone container image. Referring to FIG. 6A by way of example, this would result in the shading of the Mona Lisa face to appear on the waste container, in addition to the aforementioned visual compression and expansion of texture frequencies due to surface undulation. FIG. 6B illustrates the result when an exemplary method is similarly applied to the Mona Lisa face using an image of a tree as a source texture. In summary, this application of a method of the invention has resulted in a first image appearing to be embossed with the surface undulations of a second image by transferring surface normals from that second image to the first image.

Figure 7:
FIG. 7 illustrates the results of practice of a method of the invention on manually generated images.
Figure 7:
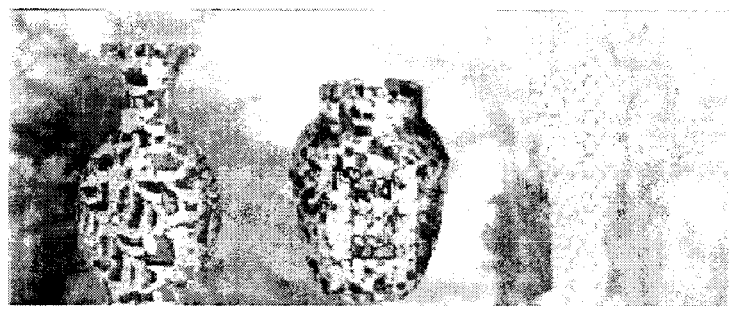

Other exemplary methods of the invention may further include steps of manually generating the image to superimpose the texture on. This may be useful, for example to apply texture through an accurate and automated program to a hand-painted or other manually generated image. FIG. 7 is useful to illustrate these exemplary steps. In FIG. 7A, three vases have been manually generated over a background. It will be appreciated that the term "manually generated" is intended to be broadly interpreted as created with some user direction. By way of example, a manually generated image can be drawn by hand using pen, pencil, paint, etc., and scanned into a computer for manipulation. By way of further example, a manually generated image may be drawn on a computer using a computer aided drawing tool or like program.

Practice of a method of the invention consistent with that illustrated in FIG. 1 results in the texture being "painted" on to the vases as shown in FIG. 7B. This can be of great utility in applying texture to manually generated images. Manual shading of such images can be done relatively accurately when they have only a simple, single color and featureless appearance as in FIG. 7A. Realistic application of the texture as shown in FIG. 7B, however, can be a difficult and tedious task if done manually. Use of a method of the invention on the manually shaded images of FIG. 7A eliminates this difficult and tedious task, and results in the realistic texture application of FIG. 7B.

Still another application for methods of the invention such as those shown in FIG. 1 will be with two-dimensional images of a three-dimensional surface generated through an automated tool. For example, computer-based tools are known that can generate a three-dimensional model based on a two-dimensional input. An image of a square or circle can be input to such a tool, for example, and an image of a cube or sphere, respectively, will be output that can be rotated as desired. Practice of the invention may be combined with such a tool, with the three-dimensional model output used as the image onto which texture is superimposed within practice of the invention.

It will be understood that although exemplary embodiments of the invention have been discussed and illustrated herein as methods, other embodiments may comprise computer program products or systems. For example, an exemplary embodiment of the invention may be a computer program product including computer readable instructions stored on a computer readable medium that when read by one or more computers cause the one or more computers to execute steps of a method of the invention. Methods of the invention, in fact, are well suited for practice in the form of computer programs. A system of the invention may include one or more computers executing a program product of the invention and performing steps of a method of the invention. Accordingly, it will be understood that description made herein of a method of the invention may likewise apply to a computer program product and/or a system of the invention. It will further be understood that although steps of exemplary method embodiments have been presented herein in a particular order, the invention is not limited to any particular sequence of steps.

What is claimed is:

1. A method for modifying an image comprising the steps of:
   selecting at least a portion of the image on which to superimpose a texture, said at least a portion of the image including a plurality of individual units;
   estimating a surface normal for each of said units using the shading of each of said individual units;
   segmenting said at least a portion of the image into a plurality of clusters;
   using said surface normals from each of said units to parameterize each of said plurality of clusters with texture coordinates by distorting said clusters by assigning some or all of said individual units in each of said clusters a new position in texture coordinates to capture a foreshortening distortion due to said estimated surface normal, said new position thereby appearing foreshortened as if projected from a surface of similar orientation;
   assigning texture to each of said clusters using said texture coordinates to create a texture patch corresponding to each of said clusters; and,
   blending said texture patches together to modify the image.

2. A method for modifying an image as defined by claim 1 wherein said at least a portion of the image depicts a three dimensional projection, wherein said texture coordinates are two-dimensional, and wherein the step of parameterizing each of said plurality of clusters comprises capturing the three dimensional projection of said at least a portion of the image with said texture coordinates.

3. A method for modifying an image as defined by claim 1 and further including the step of deforming said texture patches to align features between adjacent patches.

4. A method for modifying an image as defined by claim 1 wherein the step of segmenting into a plurality of clusters is performed using the shading of said portion of said image, and wherein the step of segmenting said at least a portion of the image into a plurality of clusters includes grouping adjacent units having similar normals into said clusters.

5. A method for modifying an image as defined by claim 4 wherein the step of grouping adjacent of said individual units together into one of said plurality of clusters is performed by initially assigning each individual unit to an individual cluster and grouping adjacent of said clusters together if an error metric is satisfied, said error metric including terms corresponding to the size of said clusters, the relative roundness of said clusters, and the relative similarity of normals for individual units within said clusters.

6. A method for modifying an image as defined by claim 1 wherein the step of estimating a surface normal for each of said individual units comprises the steps of:

assuming that said individual unit of said at least a portion of the image with the largest intensity $I_{max}$ faces a light source and that the darkest point of said at least a portion of the image portion is shadowed and its intensity $I_{min}$ indicates ambient light;

estimating a cosine c(x, y) for the angle of incidence as:

$$c(x, y) = \frac{(I(x, y) - I_{min})}{(I_{max} - I_{min})}$$

estimating a sine for the angle of incidence as:

$$s(x, y) = \sqrt{1 - c(x,y)^2}$$

using said estimated sin and cosine to estimate a normal N(x ,y):

$$G(x, y) = \nabla I(x, y) - \nabla I((x, y) \cdot S)S$$

$$N(x, y) = c(x, y)S + \frac{s(x, y)G(x, y)}{\|G(x, y)\|}$$

where $$\nabla I(x, y) = \left(\frac{\partial I}{\partial x}, \frac{\partial I}{\partial y}, 0\right)$$

is the image gradient.

7. A method for modifying an image as defined by claim 1 wherein the image is a first image, and further including the steps of determining the surface normals for a plurality of individual units that define at least a portion of a second image, and combining said surface normals from said second image with said surface normals for said individual units from said first image, and wherein the step of blending said patches results in said at least a portion of the image appearing to be embossed with the surface undulations of said at least a portion of said second image.

8. A method for modifying an image as defined by claim 7 wherein the step of combining said surface normals from said second image with said first image comprises using Poisson image editing.

9. A method for modifying an image as defined by claim 1 and further including the step of expanding each of said clusters whereby they overlap onto adjacent of others of said clusters.

10. A method for modifying an image as defined by claim 9 wherein the step of blending said texture patches together comprises identifying a visually plausible seam between adjacent of said texture patches in an overlapping region between adjacent of said texture patches.

11. A method for modifying an image as defined by claim 10 wherein said texture is comprised of pixels and wherein the step of identifying said visually plausible seam comprises performing optimization calculations to achieve similarity of adjacent pixels across said seam.

12. A method for modifying an image as defined by claim 1 and further including the steps of manually generating said at least a portion of the image.

13. A method for modifying an image as defined by claim 12 wherein the step of manually generating said at least a portion of the image further includes manually shading said at least a portion of the image.

14. A method for modifying an image as defined by claim 1 wherein said portion of the image has an image plane, wherein said new position represents a foreshortening distortion and is computed by assigning said texture coordinates for a neighboring unit of each of said individual units by projecting an image coordinate of said neighboring unit onto a recovered tangent plane for said individual unit to obtain a projection and rotating said projection back into an image plane.

15. A computer program product comprising computer executable instructions stored on a computer readable medium that when executed by one or more computers cause the one or more computers to modify a two dimensional image of a three-dimensional surface by carrying out the steps of:

selecting at least a portion of the image to superimpose a texture onto;

using the shading of said at least a portion of the image to estimate the surface normal for each pixel in said at least a portion of the image;

segmenting said at least a portion of the image into a plurality of clusters by grouping adjacent of said pixels having similar surface normals into one of said plurality of clusters;

expanding said clusters by a fixed width so that they overlap onto one another to define an overlapping region;

parameterize each of said clusters using said surface normals to result in texture coordinates for each of said clusters that model surface undulations in two-dimensions;

applying texture to said clusters according to said texture coordinates to create texture patches; and, defining a border between said patches in said overlapping region by applying an optimization that seeks to optimize similarity of pixels across said border.

16. A method for modifying an image as defined by claim 15 wherein said at least a portion of the image is of a three dimensional surface, and wherein one pair of said texture coordinates is assigned to each of said individual units and captures the projection of said three dimensional surface onto the image plane.

17. A method for modifying an image as defined by claim 15 wherein the method further includes the initial step of generating said at least a portion of the image by rendering an image of a three dimensional structure recovered from a two dimensional image.

18. A method for modifying an image as defined by claim 15 wherein the step of using said surface normals to parameterize each of said plurality of clusters with texture coordinates results in a difference between texture coordinates of neighboring of said individual units being proportional to a distance between said neighboring units when said neighboring units are projected onto a recovered tangent plane for one of said neighboring units.

19. A method for modifying an image as defined by claim 15 wherein said texture patches are non-repeating.

20. A method for modifying an image comprising the steps of:

selecting at least a portion of the image on which to superimpose a texture;

using the shading of said at least a portion of the image to segment it into a plurality of clusters;

parameterizing each of said plurality of clusters with texture coordinates;

assigning texture to each of said clusters using said texture coordinates to create a texture patch corresponding to each of said clusters;

blending said texture patches together to modify the image; and, orienting said texture in each of said texture patches to align anisotropic features of said texture by rotating patch parameterization about its centroid to align a texture direction vector with an appropriate axis.

21. A method for modifying an image as defined by claim 20 wherein the step of parameterizing each of said plurality of clusters includes setting an origin for a first of said individual units in each of said clusters, and estimating a parametric distortion for all other individual units in each of said clusters by using the recovered surface normals and propagating from said first unit outward.

22. A method for modifying an image as defined by claim 20 and further including the step of performing displacement mapping on said texture patches.

* * * * *

UNITED STATES PATENT AND TRADEMARK OFFICE
CERTIFICATE OF CORRECTION

PATENT NO. : 7,365,744 B2
APPLICATION NO. : 10/899268
DATED : April 29, 2008
INVENTOR(S) : Fang et al.

It is certified that error appears in the above-identified patent and that said Letters Patent is hereby corrected as shown below:

On the Title Page:

(56) References Cited

OTHER PUBLICATIONS
Page 1, Col. 2

In the Zhang listing, line 2, after "machine intelligence," delete "vol. 21.*" and insert
        --Vol. 21.*-- in its place.

OTHER PUBLICATIONS
(Continued on Page 2, Col. 1)

Delete the DeCarlo, D. et al. listing and insert the following in its place:
        --DeCarlo, D., and Metaxes, D. 2002. "Adjusting shape parameters using model-based
        optical flow residuals." *IEEE Trans. On PAMI 24*(6), 814-823.--

Delete the Fang, H. et al. listing and insert the following in its place:
        --Fang, H., and Hart, J.C. 2004. "Textureshop: Texture synthesis as a photograph
        editing tool." *Proc. SIGGRAPH 2004.* Los Angeles, California.--

Delete the Lee, S.-Y. et al. listing and insert the following in its place:
        --Lee, S.-Y., Chwa, K.-Y., Shin, S.Y., and Wolberg, G. 1995. "Image metamorphosis
        using snakes and free-form deformations." *Proc. SIGGRAPH 1995*, Los Angeles,
        California.--

Delete the Liu, Y. et al. listing and insert the following in its place:
        --Liu, Y., Lin, W.-C., and Hays, J. 2004. "Near-regular texture analysis and
        manipulation." *TOG 23*(3), 368-376. (Proc. SIGGRAPH).--

Delete the Pollefeys, M. et al. listing and insert the following in its place:
        --Pollefeys, M., Gool, L.V., Vergauwen, M., Verbiest, F., Cornelis, K., Tops, J., and
        Koch, R. 2004. "Visual modeling with a hand-held camera." *Intl. J. Comp. Vision
        59*(3), 207-232.--

Delete the Zhang, L., Dugas-Phocion, G. et al. listing and insert the following in its place:
        --Zhang, L., Dugas-Phocion, G., Samson, J.-S., and Seitz, S. 2001. "Single view
        modeling of free-form scenes." *Proc. CVPR.*--

CERTIFICATE OF CORRECTION (continued)
U.S. Pat. No. 7,365,744 B2

Delete the Zhang, L., Curless, B. et al. listing and insert the following in its place:
--Zhang, L., Curless, B., and Seitz, S. M. 2003. "Spacetime stereo: Shape recovery for dynamic scenes." *Proc. CVPR*, 367-374.--

Delete the Zhang, L., Snavely, N. et al. listing and insert the following in its place:
--Zhang, L., Snavely, N., Curless, B., and Seitz, S.M. 2004. "Spacetime faces: High resolution capture for modeling and animation." *Proc. SIGGRAPH 2004*, 548-558.--

In the Specification:

| | |
|---|---|
| Col. 3, Line 61 | Delete "(u,v)" and insert --$(u,v)$-- in its place. |
| Col. 3, Line 66 | Delete "(u,v)" and insert --$(u,v)$-- in its place. |
| Col. 4, Line 64 | Delete "$I_{max}$" and insert --$I_{max}$-- in its place. |
| Col. 4, Line 66 | Delete "$I_{min}$" and insert --$I_{min}$-- in its place. |
| Col. 6, Line 17 | Delete "$+ k_2||C_1-C_2||| + k_3$" and insert --$+ k_2||C_1-C_2|| + k_3$-- in its place. |
| Col. 7, Line 2 | Delete "$= (N_y/S, -N_x/s, 0)$" and insert --$= (N_y/s, -N_x/s, 0)$-- in its place. |

Signed and Sealed this

Thirtieth Day of March, 2010

David J. Kappos
*Director of the United States Patent and Trademark Office*